United States Patent [19]

Chiang

[11] Patent Number: 4,833,232

[45] Date of Patent: May 23, 1989

[54] SYNTHESIS OF NOVEL HIGHLY INTRINSIC CONDUCTING ORGANIC POLYMERS

[75] Inventor: Long Y. Chiang, Somerset, N.J.

[73] Assignee: Exxon Research and Engineering Company, Florham Park, N.J.

[21] Appl. No.: 161,955

[22] Filed: Feb. 29, 1988

Related U.S. Application Data

[63] Continuation of Ser. No. 858,714, May 2, 1986, abandoned.

[51] Int. Cl.[4] .............................................. C08G 73/06

[52] U.S. Cl. .................................... 528/423; 252/500; 427/385.5

[58] Field of Search ........................................ 528/423

[56] References Cited

U.S. PATENT DOCUMENTS 4,297,485 10/1981 Quinlan .............................. 528/423
4,507,462 3/1985 Stille .................................... 528/125
4,568,482 2/1986 Jenekhe .............................. 252/500

Primary Examiner—Christopher Henderson
Attorney, Agent, or Firm—Joseph J. Dvorak

[57] ABSTRACT

A conducting organic polymer including a cross-linked polyquinoline network and a process for making it.

5 Claims, 4 Drawing Sheets

FIG. I

SYNTHESIS OF NOVEL HIGHLY INTRINSIC CONDUCTING ORGANIC POLYMERS

This is a division, continuation, of application Ser. No. 858.714, filed May 2, 1986, now abandoned.

BACKGROUND OF THE INVENTION

The present invention relates to conducting organic polymers. Organic conjugated polymers have been systematically developed in the recent years in order to improve their transport properties, see, e.g., Wegner, G., *Angew. Chem. Int. Edn. Eng.* 1981, 20, 361; Baughman, et al, L. W. *Chem. Rev.* 1982, 82, 209; Duke, et al, "Conductive Polymers", in "Encyclopedia of Chemical Technology", Vol. 18, 755, 3rd Edn. Wiley, 1982; and Rembaum, A., *J. Polymer Sci.*, Part C, 1970, 29, 157. This resulted in a success of converting orginally insulating organic polymers to semiconducting or metallic materials by various chemical or physical treatments. There are three general strategies to achieve good electrical properties of polymers. First of all the conductivity of polymers can be upgraded by a chemical modification on the polymer at the molecular level with controlled dopants to alter the oxidation state of the polymer. Secondly, the insulated polymer can be physically combined with multiple components of conducting material to form conducting composites. Finally, the oldest interesting strategy is to modify the molecular composition or structure of the polymer directly through certain processes such as thermal chemistry to afford good intrinsic bulk transport properties. The last approach has been widely used and gained great successes in the preparation of various conducting commercial carbon films or fibers. The most extensively studied examples are the pyrolytic conversion products of polyacrylonitrile, see VanBeek, L, *J. Appl. Polym. Sci.*, 1965, 9 553 and Topchiev, A. V., *J. Polym. Sci.*, 1963, A1, 591; poly [N,N'-(p,p'-oxydiphenylene) pyromellitimide] (Kapton), see Bruck, S. D., *Polymer*, 1965, 6, 319; artificial carbon, see Vohler, et al, *Agnew. Chem. Int. Ed. Eng.* 1970, 9, 414 and Mrozowski, S., *Phys. Rev.*, 1952, 85, 609, ibid. 86, 1056; and to a lesser extent of other polymers such as poly(phenylacetylene), see Rembaum, A., *J. Polymer Sci.*, Part C, 1970, 29, 157, Gachkovskii et al, *Polym. Sci.* USSR 1968, 10, 614; poly(divinylbenzene), see Winslow et al, *J. Amer. Chem Soc.* 1955, 77, 4751; poly(acetylacetylene) see Nesmayanov et al, *Vysokomol. Soedin.*, 1960, 2, 526; Nesmeyanov et al, *Dokl. Akad. Nauk SSR*, 1960, 135, 609; Rembaum et al, *J. Polym. Sci.*, 1962, 61, 155, polyynes, see Topchiev, A. V., *J. Polym. Sci.*, Part A-1, 1963, 591; Kovshak et al, *J. Polym. Sci.*, Part C, 1963, 4, 1315; and polymeric schiff base, see Popov et al, *Vysokomol. Soedin.*, 1965, 1, 855. Conductivities generated from the thermal product of these systems at a pyrolytic temperature below 900° C. were ranged from $10^{-6}$ to 20 S/cm as shown in Table 1.

SUMMARY OF THE INVENTION

The present invention is a conducting organic polymer including a cross-linked polyquinoline network and a process for making it. The process readily lends itself to coating objects with the polymer.

DESCRIPTION OF THE PREFERRED EMBODIMENT

Figure 1:
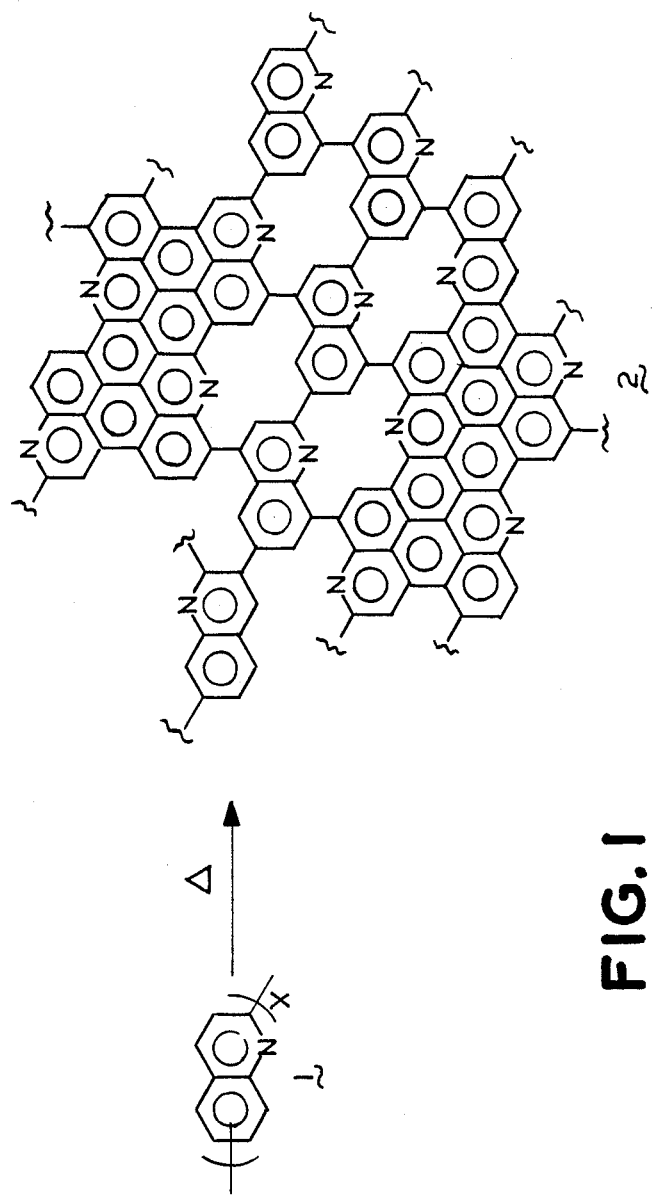
FIG. 1 shows the structure of the polymer of the present invention.

In most cases of known conductive polymers formation by the thermal treatment, the reaction occurred in the same solid form (bulk, film, or fiber) of the host polymer in multiple stages of chemistry at different temperatures (300° C. to 900° C.) without passing through a liquid phase. The present invention includes a novel composition of highly conducting polymer generated from a vapor phase pyrolytic condensation reaction of polyquinoline (1) oligmers (see FIG. 1). The new polymer exhibits an intrinsic film conductivity as high as 400 S/cm ($S=\Omega^{-1}$) at the ambient temperature. Since the reaction was tailored to occur at the vapor phase of the host polymer, it served many great advantages over the traditional pyrolytic fabrication process of conducting polymers in terms of its capability of the freely standing film formation and the direct surface coating on many different substrates for application. Interestingly, the resulting polymer product is one of the most thermally stable organic polymer. It is also stable at ambient conditions.

The origin of the observed high intrinsic conductivity of this system is believed to be derived from the number increase of charge carriers via the formation of stable free radicals and the increase of charge carrier mobilities by the highly extended molecular delocalization through a condensed aromatic structure. This condensed aromatic structure is believed to be a highly cross-linked polyquinoline network through direct free radical condensations between adjacent linear host polymers. Those free radicals were generated by the thermal cleavage of aromatic C—H bond at a temperature near to 600° C. that created many reactive sites around the vicinity of quinoline ring giving raise to the fusion of the carbon-carbon bond.

Conditions for the thermal chemistry of polyquinoline oligmer, the product characterization, and the study of physical properties of resulting new materials are described below.

Polyquinoline oligmers were synthesized (described below) from a catalytical dehydrogenative polymerization of tetrahydroquinoline (THQ) using rhenium sulfide as a catalyst at the refluxing temperature of THQ. The product was fractionized by solubilities in different solvents such as diethylether, methylene chloride, and acetic acid.

$^{13}$C-NMR spectra were recorded on a JEOL FX60Q spectrometer for solid-state spectra using CPMAS (cross-polarization magic angle spinning) technique. Infrared spectra were recorded on a Perkin-Elmer 680 series spectrometer as KBK pellets. Ultra-violet spectra were recorded on a Perkin-Elmer 330 spectrophotometer using thin films (1000–4000 Å thickness) coated on a quartz substrate.

The thickness of film was measured by the Styre's technique on a profilometer. The film conductivity was measured in terms of the sheet resistivity by the in-line four-point probe (FPP) technique, see Perloff, D. S., *J. Electrochem. Soc.*, 1976, 123, 1745, with a Signatone

EXAMPLE

General Procedure for the Preparation of Polyquinoline Oligmers by Dehydrogenative Polymerization Reaction A single-neck round bottle flask equipped with a condensor and an inert gas bubbler was charged with a solution of tetrahydroquinoline (25 ml, 98%, 0.19 mol) and a proper amount of rhenium sulfide catalyst (500 mg to 1g). The suspension mixture was maintained under an argon atmospheric pressure and heated in the heating mantle at 150° C. initially and then at 200° to 300° C. for two days to one week. A preferred temperature is about 270° C.

At this temperature, a gentle reflux of tetrahydroquinoline was obtained. At the end of the reaction, the resulting product was cooled to the room temperature to give a dark solid. It was transferred into a solution mixture of diethylether-hexane/1:3 (300 ml). The resulting suspension solution was stirred overnight at the room temperature. The insoluble solid was then filtered and washed with another portion of diethylether-hexane/1:3 (50 ml). A repeated methylene chloride extraction of the solid separated the product into a methylene chloride soluble fraction and a methylene chloride insoluble fraction. The methylene chloride soluble fraction was dried on a rotary evaporator to give an orange-brown thick paste which solidified on standing. It was then chromatographed on a silica gel column using a solvent mixture of ethylacetate-hexane/1:3 as eluent initially. The solvent composition was changed slowly to ethylacetate-methylene chloride-hexane/1:1:2. The elution of column chromatography was continued until no more product in the eluent can be detected. Combined solvents were evaporated to afford a yellow solid of the soluble polyquinoline in a 54% yield (13.5 g).

The methylene chloride insoluble fraction was treated with a highly concentrated aqueous hydrochloric acid solution of a ratio of conc. HCl-H$_2$O/1:1 (500 ml) overnight with a vigorous stirring. The resulting thick solution was diluted with water (500 ml) and then filtered through a sintered glass frit under vacuum. The insoluble black solid was washed with more portions of dilute hydrochloric acid and water to give a black recovered catalyst (580 mg to 1.2 g).

The remaining hydrochloric acid solution was neutralized by an addition of sodium hydroxide pellets to affford a precipitation. The filtration of precipitates gave a grey solid of the methylene chloride insoluble polyquinoline in a 36% yeild (9 g). Therefore, the combined fractions of polyquinoline gave a total yield of higher than 90%.

EXAMPLE

General Procedure of the Thermal Conversion of Polyquinoline Oligmers

Polyquinoline oligmers (1 g) were dissolved in a methylene chloride solution (50 ml). The mixture was placed in a quartz tube (1.25 inches in diameter and 18 inches in length) under an inert atmosphere. The solvent was then slowly evaporated under a vacuum (0.05 mm Hg) while constantly kept the tube rotating to ensure a homogeneous deposition of polyquinoline on the internal wall of tube. It was then sealed under a vacuum and placed in an oven. The temperature of oven was monitored to have a rapid and homogeneous heating rate at temperatures between 25° C. and 1300° C. Normally the reaction was carried out from the room temperature to the desired temperature (500° C. to 1300° C.) at a 30° C./min heating rate and then kept at that temperature for a certain period of time (one to five hours). It was observed that polyquinoline oligmers were slowly softened and then vaporized when the temperature reached 600° to 700° C. After one hour of continuous heating, the full tube was coated with transparent viscous liquids on the internal surface in addition to vapors. That strongly reflected the heat resulting in the observation of the tube in bright pink-red color. Slowly cooling it to a temperature below 570° C., a black film was precipitated on the surface of wall. The thickness of film is proportional to the amount of oligmers used. In general, a film with a thickness higher than 1–10 microns could be isolated from the surface as a freely standing film at the room temperature. The total yield of pyrolytic polymers recovered from the reaction was found to be 86% (860 mg) with a less than 15% of weight loss.

In the most cases, the conductivity measurements and the UV spectra recording were carried out with thin films (2000–5000 Å thickness) strongly bonded on the quartz surface.

The direct thin surface coating of this pyrolyzed polymer onto various substrates was performed by carefully placing the surface pre-cleaned substrate in the reaction vessel to allow an exposure of surface to the polymer vapor. Substrate materials used in the study included quartz, stainless steel, molybdium, ceramics, copper, platinum, nickel, silicone, et al.

Figure 2:
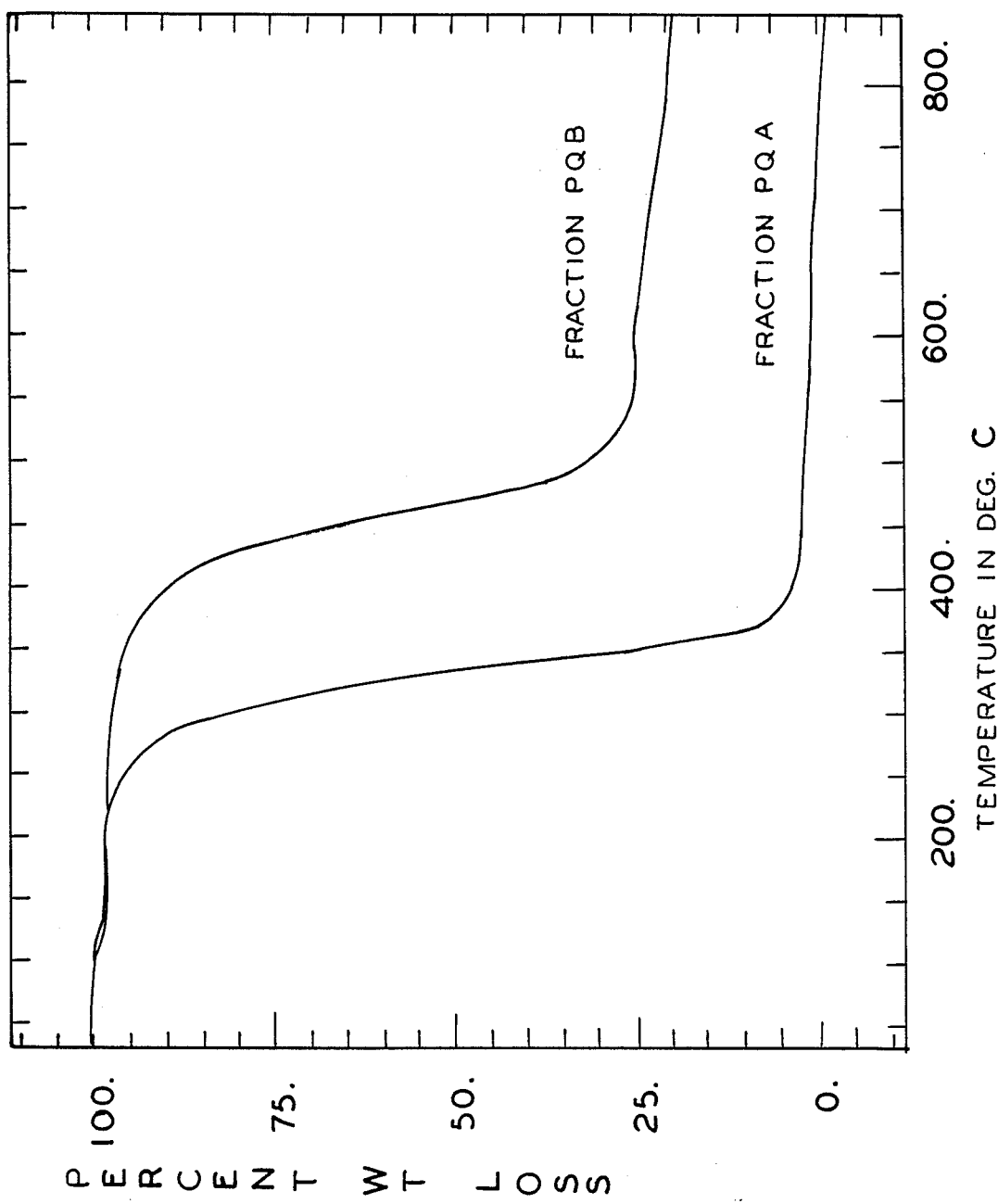
FIG. 2 shows a thermogravimetry analysis of polyquinoline oligomers.

Two solubility class of oligmer 1 were studied in this example, namely, the fraction soluble in methylene chloride and insoluble in diethylether-hexane/1:1 (franction A of polyquinoline, PQA) and the fraction soluble in acetic acid and insoluble in methylene chloride (fraction B of polyquinoline, PQB). The thermogravimetry analysis (TGA) of both fractions showed a sharp vaporization temperature starting at 300° C. for fraction PQA and at 405° C. for fraction PQB (FIG. 2). It indicated a very narrow molecular weight distribution of both fractions and a lower molecular weight of fraction PQA comparing to that of fraction PQB. Unlike PQA, the fraction PQB contained a roughly 25% component of an even higher molecular weight polymer with a vaporization temperature close to the initial reaction temperature of 550°–600° C. Since polyquinoline is a fully aromatic system with aryl C—H bonds as a sole kind of bonds capable of undergoing thermal cleavage at a temperature near 600° C., the dehydrogenative fusion reaction of carbon-carbon bond has to carry out above that temperature. Therefore, under this condition, polyquinoline oligmers were vaporized in the vacuum vessel before the reaction took place. It should be noted that the vapor phase reaction of organic molecules are quite commonly studied, but it remains very rare for organic conjugated polymer system. It is mainly due to the extremely low volatility of these type of polymers. In that case, the pyrolytic reaction occurred without even passing through a liquid phase.

It was found that the thermal reaction was best performed at 700° C. to 900° C. for a period of one hour. A lower reaction temperature than 700° C. resulted in a slow decline of the measured film conductivity of the product. A higher reaction temperature than 900° C.

gave a film with an increasing fragility. Elemental analysis on the 700° C. treated fraction PQA and PQB formulated the polymer product as $C_9H_{2.4}N_{0.8-0.9}$ (H/C=0.27) and $C_9H_{2.0}N_{0.8-0.9}$ (H/C=0.22), respectively. Interestingly, these data were consistent with the fact that the integrity of the major portion of quinoline moiety in the polymer product remained intact during the pyrolytic process. Electron microscopic (225,000 X) study of the thin product film showed an amorphous appearance of the film without any graphite type structural feature. Powder X-ray diffraction pattern was also studied to show two very weak and diffused peaks centered at 3.35 Å and 5.1 Å. Therefore, the extended aromatic conjugation in the product structure thermally produced from a high degree of cross linking between quinoline units did not form a strong layer type structure close to that of graphite. However, it is very interesting that without possessing an enhanced layer or crystalline structure in the polymer network such as that of graphite crystal, this thermal product of polyquinoline already exhibits an intrinsic conductivity higher than most of pyrolytic organic polymers having been made.

Figure 3:
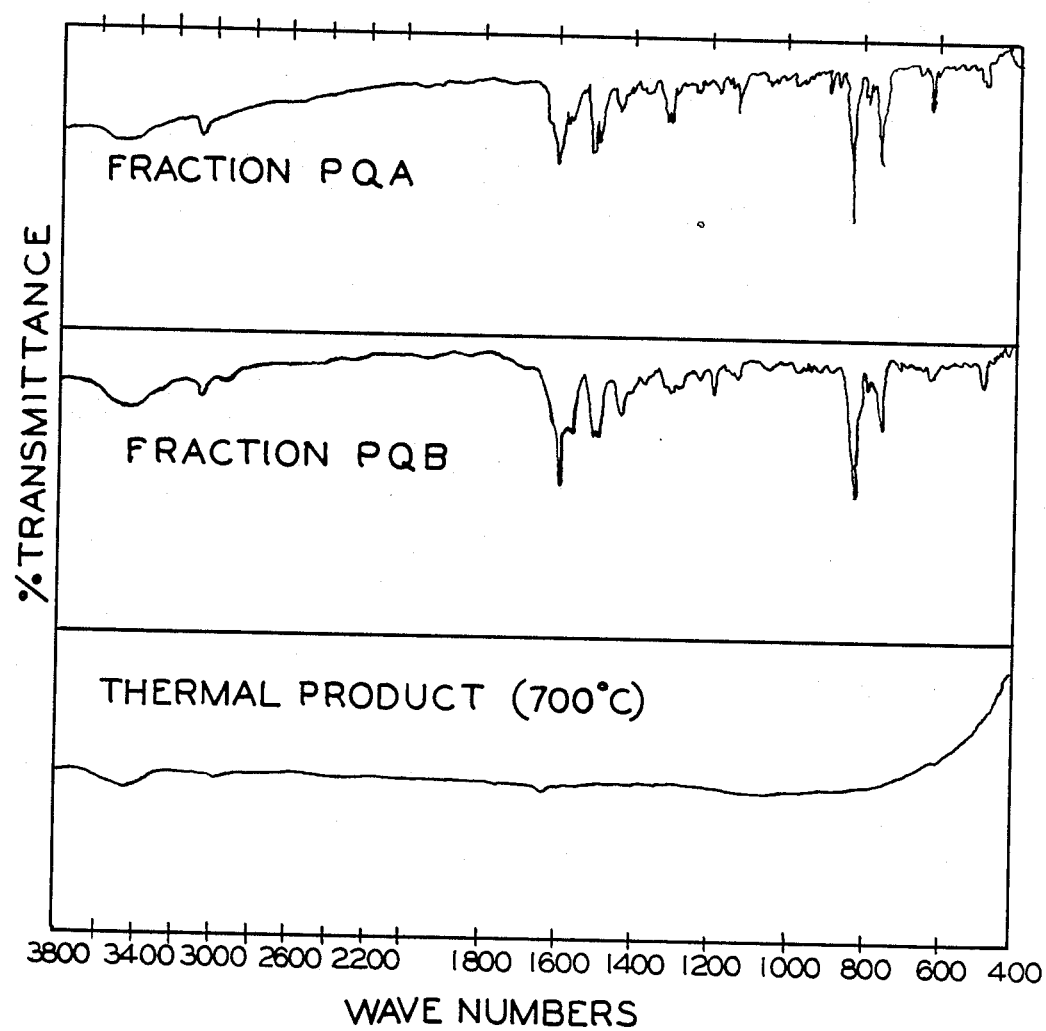
FIG. 3 shows an IR spectra comparison between fractions PQA, PQB, and the thermal product.
Figure 4:
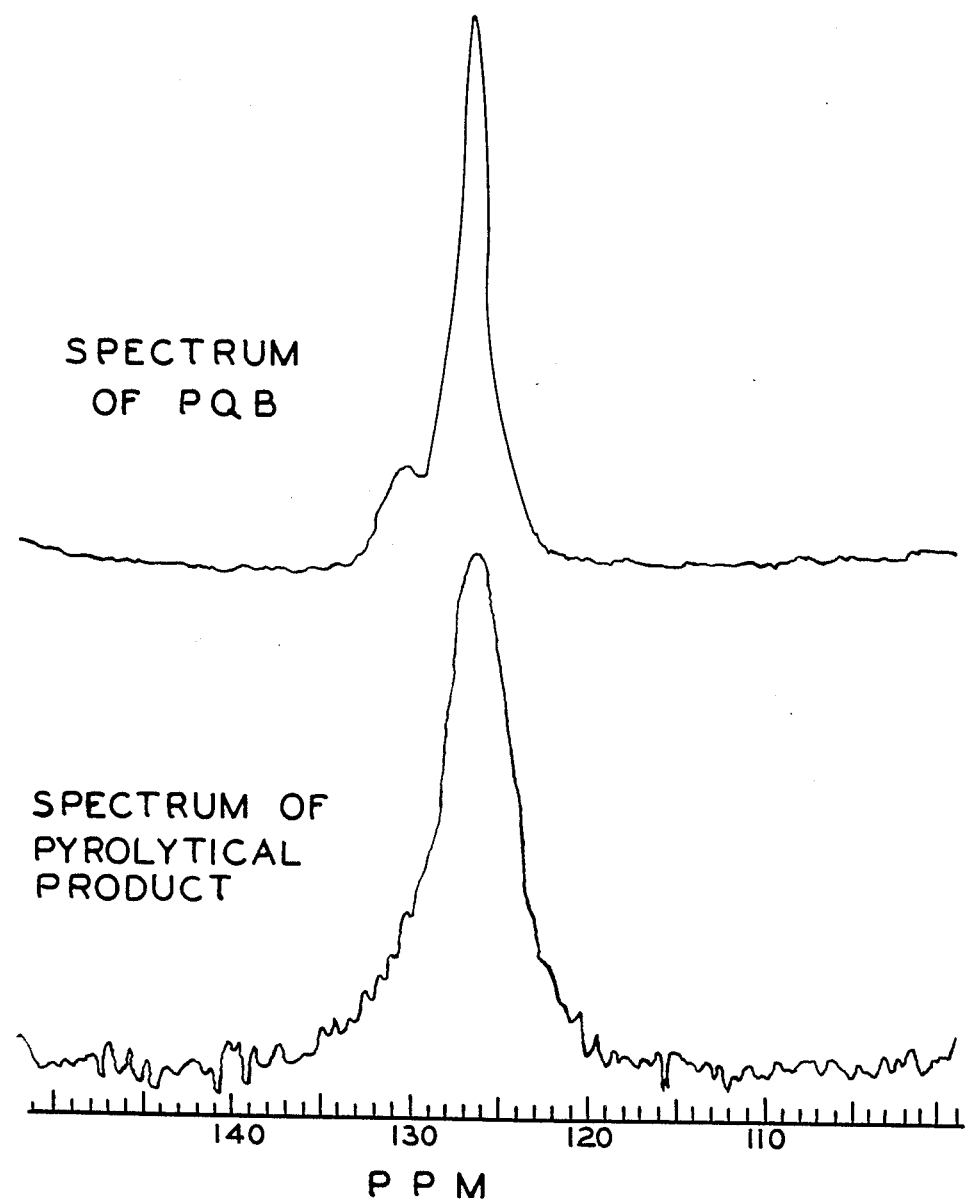
FIG. 4 shows a solid state $^{13}$C-NMR of the thermal product showing a broader peak centered at 125 ppm compared to that of the fraction PQB.

The IR spectra comparison between fractions PQA, PQB, and the thermal product was shown in FIG. 3. The disappearance of virtually all bands was observed in the IR spectrum of the thermal product that bore a close resemblance to IR of the most of other types of known pyrolytic product. Solid State $^{13}$C-NMR of the thermal product (FIG. 4) gave a broader peak centered at 125 ppm comparing to that of the fraction PQB. This agreed with the cross-linked structure in the product resulted from the original linear polyquinoline polymer chain. Finally, UV-Visible spectrum of thermal products as a thin film coated on a quartz substrate showed a very broad band with a tail covering an entire range of UV and visible frequencies. It further revealed a highly extended aromatic nature of the product.

Conductivities of these black film products generated from fractions PQA and PQB at 700° C. were found to be 54 S/cm and 60 S/cm, respectively at the room temperature. The slightly higher conductivity for PQB sample seems corresponding to its lower H/C ratio. The conductivity of film made from PQA at 900° C. was found to be 400 S/cm. This observed intrinsic conductivity is among the highest one comparing to that of other pyrolytic products generated from pure synthetic organic polymer under a relatively mild condition (below 900° C.). As shown in Table 1, although the synthetic graphite, see Vohler et al, *Angew Chem. Int. Ed. Eng.*, 1970, 9, 414, has a higher conductivity (1000–2000 S/cm), however, it was fabricated under a rather severe condition at 2200°–3000° C.

TABLE 1

Comparison of Conductivities ($\sigma_{RT}$) Between Various Pyrolytic Organic Polymer Products

| Polymer | $\sigma_{RT}$(S/cm) of Polymer | Pyrolysis Conditions (°C.) | $\sigma_{RT}$ of Product |
|---|---|---|---|
| Polyquinoline Oligmer (This invention) | $10^{-12}$ | 700 | 54–60 |
|  |  | 900 | 400 |
| Kapton (DuPont) |  | 700 | 0.1 |
|  |  | 850 | 20 |
| Polyacrylonitrile | $4 \times 10^{-12}$ | 600 | $10^{-5}$–$10^{-3}$ |
| Poly(divinylbenzene) | $10^{-18}$ | 700 | $10^{-6}$ |
|  |  | 1,000 | 100 |
| Polyphenylacetylene | $10^{-13}$–$10^{-15}$ | 700 | $5 \times 10^{-2}$ |
| Polyynes | $10^{-6}$–$10^{-14}$ | 600 | 2 |
| Polyacetylacetylene | 870 | $10^{-2}$ |  |
| Polymeric Schiff Base | $10^{-13}$ | 500 | $6 \times 10^{-2}$ |
| Carbon |  | 600 | $10^{-5}$ |
|  |  | 1,000 | 2 |
|  |  | 2,200–3,000 | 1,000–2,000* |

*= Conductivity measured parallel to surface of single crystal of artificial graphite, $\sigma \parallel / \perp = 5,000$

What is claimed is:

1. A conducting organic polymer consisting essentially of quinoline moieties highly cross-linked to each other in a condensed nitrogen-containing aromatic structure.

2. A conducting organic polymer formed by heating polyquinoline oligomers consisting essentially of quinoline moieties under vacuum at a temperature sufficient to vaporize the oligomers and thereafter cooling said vaporized oligomers, whereby a conductive polymer is obtained.

3. A process for forming a conducting organic polymer consisting essentially of quinoline moieties in a condensed aromatic structure comprising:
   (a) forming polyquinoline oligomers,
   (b) heating said polyquinoline oligomers to a temperature between 600° C. and 1300° C. so as to form a vapor, and
   (c) condensing said vapor whereby a conducting polymer consisting essentially of polyquinoline moieties in a condensed aromatic structure is formed.

4. The polymer of claim 1 wherein said polymer has an intrinsic film conductivity of greater than about 54 S/cm at ambient temperature.

5. The polymer of claim 2 wherein said oligomers are heated at temperatures in the range of between about 600° C. to about 1300° C.

* * * * *